(12) United States Patent
Ebbo et al.

(10) Patent No.: US 7,530,058 B2
(45) Date of Patent: May 5, 2009

(54) NON-COMPILE PAGES

(75) Inventors: David S. Ebbo, Redmond, WA (US); Shanku Shivabrata Niyogi, Bellevue, WA (US); Andres M. Sanabria, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 10/857,657

(22) Filed: May 28, 2004

(65) Prior Publication Data

US 2005/0268292 A1 Dec. 1, 2005

(51) Int. Cl.
*G06F 9/45* (2006.01)
(52) U.S. Cl. .................................. 717/143; 717/126
(58) Field of Classification Search .................. None
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |
| 5,299,315 A | 3/1994 | Chin et al. | |
| 5,349,657 A | 9/1994 | Lee | |
| 5,388,156 A | 2/1995 | Blackledge, Jr. et al. | |
| 5,465,332 A | 11/1995 | Deloye et al. | |
| 5,517,655 A | 5/1996 | Collins et al. | |
| 5,548,340 A | 8/1996 | Bertram | |
| 5,550,560 A | 8/1996 | Kanada et al. | |
| 5,604,908 A | 2/1997 | Mortson | |
| 5,638,176 A | 6/1997 | Hobbs et al. | |
| 5,640,449 A | 6/1997 | Worley et al. | |
| 5,664,228 A | 9/1997 | Mital | |
| 5,675,520 A | 10/1997 | Pitt, III et al. | |
| 5,706,505 A | 1/1998 | Fraley et al. | |
| 5,732,256 A | 3/1998 | Smith | |
| 5,732,267 A | 3/1998 | Smith | |
| 5,745,103 A | 4/1998 | Smith | |
| 5,748,890 A | 5/1998 | Goldberg et al. | |
| 5,774,670 A | 6/1998 | Montulli | |

(Continued)

FOREIGN PATENT DOCUMENTS

EP 1156428 12/2000

(Continued)

OTHER PUBLICATIONS

Stone, R.G. and J. Dhiensa. "Proving the Validity and Accessibility of Dynamic Web-pages," ACM Internatioanl Conference Proceeding Series vol. 63, pp. 45-49, 2004.*

(Continued)

*Primary Examiner*—Tuan Q Dam
*Assistant Examiner*—Cheneca P Smith
(74) *Attorney, Agent, or Firm*—Merchant & Gould P.C.

(57) ABSTRACT

A concept for providing a process for parsing at least one code object comprising determining when a page associated with the at least one code object has been previously processed; parsing the page when the page is determined not to have been previously processed; and evaluating a value for a compilation attribute for the page, is described.

7 Claims, 4 Drawing Sheets

U.S. PATENT DOCUMENTS

| | | | |
|---|---|---|---|
| 5,793,982 | A | 8/1998 | Shrader et al. |
| 5,812,996 | A | 9/1998 | Rubin et al. |
| 5,835,724 | A | 11/1998 | Smith |
| 5,855,020 | A | 12/1998 | Kirsch |
| 5,878,141 | A | 3/1999 | Daly et al. |
| 5,878,282 | A | 3/1999 | Mital |
| 5,897,622 | A | 4/1999 | Blinn et al. |
| 5,911,068 | A | 6/1999 | Zimmerman et al. |
| 5,918,007 | A | 6/1999 | Blackledge, Jr. et al. |
| 5,940,075 | A | 8/1999 | Mutschler, III et al. |
| 5,940,847 | A | 8/1999 | Fein et al. |
| 5,953,524 | A | 9/1999 | Meng et al. |
| 5,956,489 | A | 9/1999 | San Andres et al. |
| 5,961,601 | A | 10/1999 | Iyengar |
| 5,963,952 | A | 10/1999 | Smith |
| 5,983,227 | A | 11/1999 | Nazem et al. |
| 5,991,802 | A | 11/1999 | Allard et al. |
| 6,006,230 | A | 12/1999 | Ludwig et al. |
| 6,014,637 | A | 1/2000 | Fell et al. |
| 6,014,666 | A | 1/2000 | Helland et al. |
| 6,032,207 | A | 2/2000 | Wilson |
| 6,038,551 | A | 3/2000 | Barlow et al. |
| 6,067,578 | A | 5/2000 | Zimmerman et al. |
| 6,072,664 | A | 6/2000 | Aoyagi et al. |
| 6,076,108 | A | 6/2000 | Courts et al. |
| 6,101,607 | A | 8/2000 | Bachand et al. |
| 6,108,717 | A | 8/2000 | Kimura et al. |
| 6,115,744 | A | 9/2000 | Robins |
| 6,121,968 | A | 9/2000 | Arcuri et al. |
| 6,138,150 | A | 10/2000 | Nichols et al. |
| 6,167,524 | A | 12/2000 | Goodnow et al. |
| 6,178,461 | B1 | 1/2001 | Chan et al. |
| 6,185,608 | B1 | 2/2001 | Hon et al. |
| 6,203,220 | B1 | 3/2001 | Takenoshita et al. |
| 6,205,480 | B1 | 3/2001 | Broadhurst et al. |
| 6,212,192 | B1 | 4/2001 | Mirashrafi et al. |
| 6,218,958 | B1 | 4/2001 | Eichstaedt et al. |
| 6,230,160 | B1 | 5/2001 | Chan et al. |
| 6,246,422 | B1 | 6/2001 | Emberling et al. |
| 6,247,044 | B1 | 6/2001 | Gosling et al. |
| 6,253,228 | B1 | 6/2001 | Ferris et al. |
| 6,253,234 | B1 | 6/2001 | Hunt et al. |
| 6,279,151 | B1 | 8/2001 | Breslau et al. |
| 6,286,133 | B1 | 9/2001 | Hopkins |
| 6,305,012 | B1 * | 10/2001 | Beadle et al. ............... 717/148 |
| 6,326,957 | B1 | 12/2001 | Nathan et al. |
| 6,334,157 | B1 | 12/2001 | Oppermann et al. |
| 6,343,148 | B2 | 1/2002 | Nagy |
| 6,351,767 | B1 | 2/2002 | Batchelder et al. |
| 6,353,447 | B1 | 3/2002 | Truluck et al. |
| 6,354,477 | B1 | 3/2002 | Trummer |
| 6,363,352 | B1 | 3/2002 | Dailey et al. |
| 6,370,561 | B1 | 4/2002 | Allard et al. |
| 6,373,841 | B1 | 4/2002 | Goh et al. |
| 6,397,253 | B1 | 5/2002 | Quinlan et al. |
| 6,401,099 | B1 | 6/2002 | Koppulu et al. |
| 6,405,241 | B2 | 6/2002 | Gosling et al. |
| 6,412,008 | B1 | 6/2002 | Fields et al. |
| 6,430,575 | B1 | 8/2002 | Dourish et al. |
| 6,460,071 | B1 | 10/2002 | Hoffman |
| 6,460,141 | B1 | 10/2002 | Olden |
| 6,463,442 | B1 | 10/2002 | Bent et al. |
| 6,480,894 | B1 | 11/2002 | Courts et al. |
| 6,487,665 | B1 | 11/2002 | Andrews et al. |
| 6,505,238 | B1 | 1/2003 | Tran |
| 6,530,075 | B1 * | 3/2003 | Beadle et al. ............... 717/114 |
| 6,546,516 | B1 | 4/2003 | Wright et al. |
| 6,557,038 | B1 | 4/2003 | Becker et al. |
| 6,560,598 | B2 | 5/2003 | Delo et al. |
| 6,560,618 | B1 | 5/2003 | Ims |
| 6,564,251 | B2 | 5/2003 | Katariya et al. |
| 6,591,272 | B1 | 7/2003 | Williams |
| 6,606,418 | B2 | 8/2003 | Mitchell et al. |
| 6,622,168 | B1 | 9/2003 | Datta |
| 6,633,416 | B1 | 10/2003 | Benson |
| 6,725,219 | B2 | 4/2004 | Nelson et al. |
| 6,728,421 | B2 | 4/2004 | Kokemohr |
| 2001/0054020 | A1 | 12/2001 | Barth et al. |
| 2002/0004815 | A1 | 1/2002 | Muhlestein et al. |
| 2002/0008703 | A1 | 1/2002 | Merrill et al. |
| 2002/0083171 | A1 | 6/2002 | Hoogenboom et al. |
| 2002/0108102 | A1 | 8/2002 | Muhlestein et al. |
| 2002/0188890 | A1 | 12/2002 | Shupps et al. |
| 2003/0009476 | A1 | 1/2003 | Fomenko et al. |
| 2003/0009519 | A1 | 1/2003 | Gosling et al. |
| 2003/0009567 | A1 | 1/2003 | Farouk |
| 2003/0018827 | A1 | 1/2003 | Guthrie et al. |
| 2003/0025728 | A1 * | 2/2003 | Ebbo et al. ............... 345/744 |
| 2003/0028565 | A1 | 2/2003 | Landsman et al. |
| 2003/0074634 | A1 | 4/2003 | Emmelmann |
| 2003/0097639 | A1 | 5/2003 | Niyogi et al. |
| 2004/0003112 | A1 | 1/2004 | Alles et al. |
| 2004/0003139 | A1 | 1/2004 | Cottrille et al. |
| 2004/0003248 | A1 | 1/2004 | Arkhipov |
| 2004/0073873 | A1 | 4/2004 | Croney et al. |
| 2004/0255233 | A1 * | 12/2004 | Croney et al. ............... 715/500 |

FOREIGN PATENT DOCUMENTS

| | | |
|---|---|---|
| EP | 1156415 | 11/2001 |
| EP | 01111680.3-2201 | 4/2002 |
| EP | 01111681.1-2001 | 4/2002 |
| EP | 1156427 | 4/2002 |
| EP | 1164473 | 4/2002 |
| WO | WO 98/21651 | 5/1998 |
| WO | WO 98/44695 | 10/1998 |
| WO | WO 99/34288 | 7/1999 |

OTHER PUBLICATIONS

Scott, David and Richard Sharp, "Developing Secure Web Applications", IEEE Internet Computing, vol. 6 No. 6, pp. 38-45, Nov.-Dec. 2002.*

"A Brief History of Hypertext", from Microsoft Corporation © 1996.

"Alterego Networks Introduces First Mobile Web Server for Enterprises, Telcos and Providers"; Redwood City, CA; Nov. 14, 2000; 3 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Bluestone Software Layes Foundation for Internet Operating Environment with Total-E-Server . . . " Screaming Media, Business Wire; Jun. 5, 2000; 3 pages.

"Developing ASP-Based Applications" from Microsoft Corporation © 1996.

"HTML Encyclopedia"; http://www.scit.wlv.ac.uk/encyc/form.html; 2 pages.

"HTTP Made Really Easy—A Practical Guide to Writing Clients and Servers", by Marshall, Aug. 15, 1997.

Anderson, Richard; Homer, Alex; Howard, Rob; Sussman, Dave; "A Preview of Activer Server Pages+"; Copyright 2000, Wrox Press, pp. 1-73.

Article, ColdFusion Web Application Server, update and summary, from Allaire Corp—www@allaire.com.

Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.

Chapter 6, "Session Management Service," Server-Side Javascript Guide, 'Online! 1999, pp. 125-126, www.developer.netscape.com/docs/manuals/ssjs/1_4/ssjs.pdf>.

Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dobson, R., "Data Binding in Dynamic HTML," DBMS MAG, 'Online! Mar. 1998 pp. 47-52.

Dowd, Tyson et al., "Compiling Mercury to the .NET Common Language Runtime," Electronic Notes in Theoretical Computer Sciences 59 No. 1 (Netherlands) (2001), pp. 1-16.

Duan, Nick N.; "Distributed Database Access in a Corporate Environment Using Java" Bell Atlantic Corporation; 1996; 8 pages.

Esposito, Dino, "Heaven sent," Developer Network Journal, Mar.-Apr. 2001, Matt Publishing, UK, No. 23, pp. 18-24.

Franklin, K., "Supercharge Data Binding," Visual Basic Programmer's Journal, Mar. 2000, Fawcette Technical Publications, vol. 10, No. 3, pp. 32-33, 39-40, 42, 44, 46.

Frost, Jim: "Windows NT Security"; May 4, 1995; 7 pages; http://world.std.com/~jimf/papers/nt-security/nt-security.html.

Hammock swings through Web Interfaces (3 pages) by Eric Hammond.

Hammock(TM), Think of it as Swing(TM) for the Web (10 pages).

Hannay, Phillip et al., "MSIL For the .NET Framework: The Next Battleground?", Virus Bulletin Conference, Sep. 2001, pp. 173-196.

Holmes, John W.; e-Mail response to question regarding GET/POST. HTTP request, extracted from GOOGLE's News Groups, php.general, Nov. 11, 2002.

Hovanes, Michael E.; Deal, John R. Grizz; Rowberg, Alan H.; "Seamless Multiresolution Display of Portable Wavelet- Compressed Images" Journal of Digital Imaging, vol. 12, No. 2 suppl 1 (May 1999), pp. 109-111.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Kunz, T.; El Shentenawy, M.; Gaddah, A..; Hafez, R.; Image Transcoding for Wireless WWW Access: The User Perpesctive; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management,"Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

OOP Launches Hammock at JavaOne (1 page).

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Pyarali, Irfan; O'Ryan, Carlos; Schmidt, Douglas; Wang, Nanbor; Gokhale, Anirudha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shapiro, M., "A Binding Protocol for Distributed Shared Objects," Proceedings of the International Conference on Distributed Computing Systems, Proznan, Poland, Jun. 21-24, 1994, Los Alamitos, IEEE Comp. Soc. Press.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

Stewart, Tony: "The Document as Application: Issues and Implications" GCA XML Europe 1999; pp. 575-599.

Syme, Don, "ILX: Extending the .NET Common IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191.

* cited by examiner

NON-COMPILE PAGES

TECHNICAL FIELD

This disclosure relates to formation of code objects and applications, such as web pages, and, more particularly, to compilation or non-compilation of the code objects.

BACKGROUND

Computer systems have evolved significantly during the last century. Starting from relatively slow, electromechanical data manipulation processors employed primarily by large businesses, present-day computer systems include a broad gamut of markedly higher-speed computation devices ranging from massively parallel processing complexes to highly agile, portable and interconnectable multiple-function computation engines enjoying far broader distribution and a markedly richer ensemble of applications than in past.

One consequence of the dramatic expansion of computer systems has been need for increased memory for storage of computer-related or user-accessible information. While the development of larger capacity memories continues to provide improvements in time to access memory contents, despite increases in memory size, substantial performance advantages and improved competitive postures also result from techniques that improve how memory capabilities are employed.

In many systems, when an application or page is developed, the developer provides high-level instructions to form code objects that are not directly comprehensible by a computer or processor. However, at some juncture, these instructions need to be rendered into a form usable by a processor, such as DLLs, or dynamic link libraries. These include or access a series of micro-instructions that are interpretable by a processor, and are formed from the code objects.

Another consequence of the expansion of computer system utilization has been increased demand for rapidity of execution of computer tasks. Certain web and application servers compile the code objects, for example in web applications, rather than interpret the code, in order to speed execution of the application. For example, by parsing and then compiling the code objects which the developer has produced, an executable image may be formed. The compilation process can automatically detect any changes, dynamically compile the files comprising the code objects if needed, and store or cache the compiled results to facilitate reuse on subsequent requests.

These kinds of advantages tend to promote scalability, or a capacity to increase or decrease system size, number and/or size of applications that can be simultaneously provided, increasing the number of users who can be serviced at any one time, speed of service and the like. In turn, increased scalability provides competitive advantages because of the improvements in user capabilities.

However, the compilation process has at least the following drawbacks relating to scalability:

Multiple assemblies need to be created per application, and

Additional code needs to be loaded in the process to serve application requests which are evident when a site has hundred or thousands of pages in a single web application.

There are thus increasing needs for methods and apparatus for increasing flexibility of applications for scalable computer systems and providing performance improvements.

SUMMARY

In one aspect, the present disclosure describes a process for instantiating a page object comprising parsing a description of the page object to determine a compilation mode therefor.

In another aspect, the present disclosure describes a process for defining compilation behavior of a page comprising setting a compilation attribute to one of: AUTOMATIC, NEVER and ALWAYS.

In yet another aspect, the present disclosure describes a process for parsing at least one code object comprising determining when a page associated with the at least one code object has been previously processed, parsing the at least one code object when the page is determined not to have been previously processed and evaluating a value for a compilation attribute for the page.

BRIEF DESCRIPTION OF THE CONTENTS

DETAILED DESCRIPTION

The present disclosure describes techniques and apparatus for providing improved scalability of web sites and for facilitating augmentation of web sites. Aspects of the disclosure enhance user capability for rapidly accessing information and services via shared or distributed computer systems. Other aspects reduce memory loading and/or increase responsiveness of such systems.

The ability to efficiently provide information in a non-distracting manner enables even a relatively unsophisticated user to efficiently employ the system and also assists in providing access to such systems when language barriers or other communications obstacles may be present. As a result, user, information technologist and/or host attributes of the overall system are improved.

Introduction

Prior to describing several embodiments illustrating how improved scalability and access to, e.g., Internet pages, may be implemented, the following section addresses an exemplary environment in which such technology finds utility. The discussion of the environment provides a framework within which various elements of the improved information distribution technology can be developed.

Environment

Figure 1:
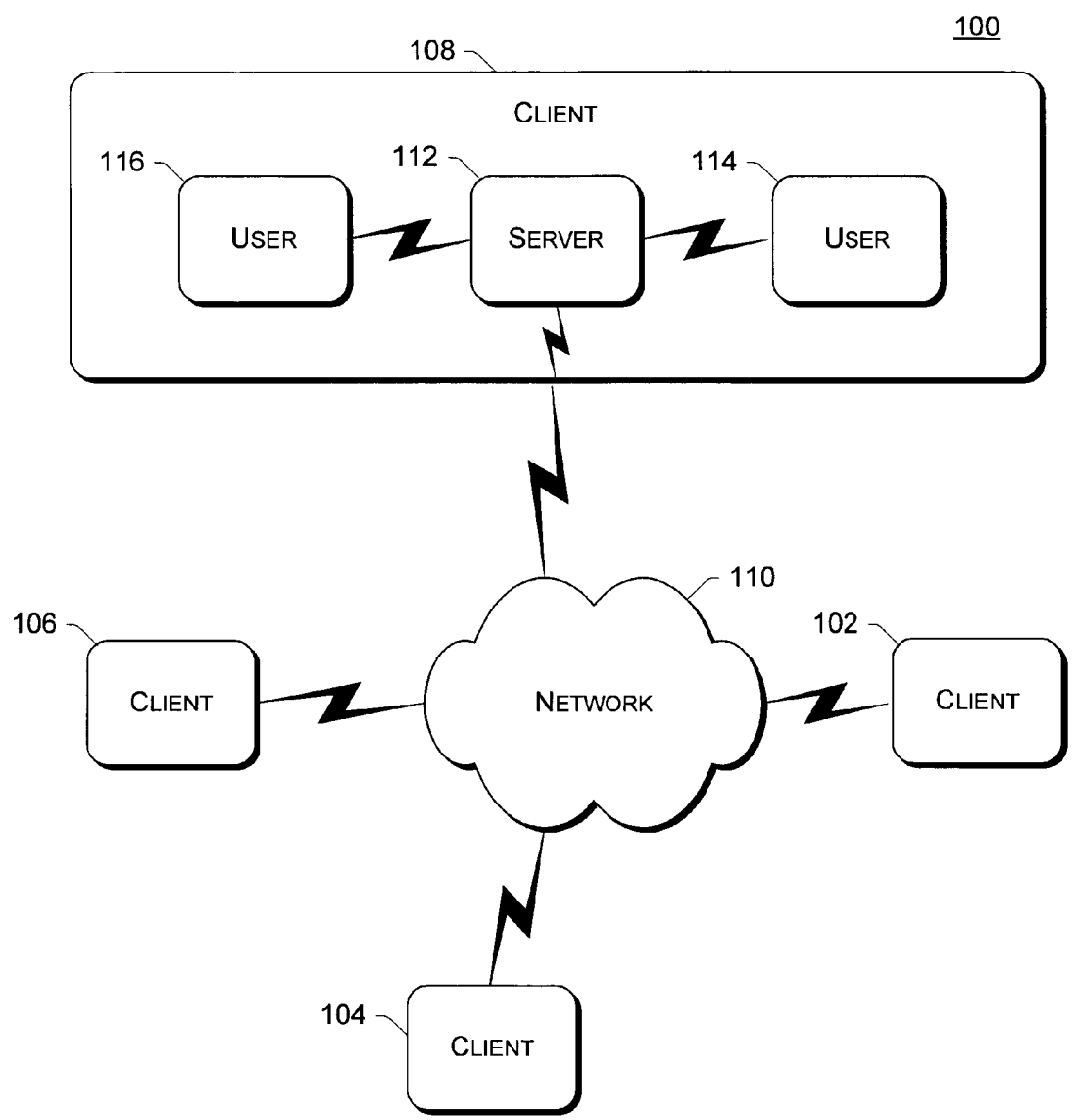
FIG. 1 illustrates an exemplary environment suitable for the concepts of the present disclosure.

FIG. 1 illustrates an exemplary environment 100 suitable for implementation of the presently-disclosed concepts. The environment 100 is represented by clients, e.g., clients 102, 104, 106 and 108, interconnected via a network 110, such as the Internet, a LAN, a WAN etc. In the context of this disclosure, a client 102, 104, 106 or 108 may be a user, a web site programmer or an entity, such as a vendor or other party, having a web site for promoting interactions with one or more users.

Each client may include a server, such as server 112 shown in association with client 108, coupled to users 114, 116. It will be appreciated that while only four clients 102, 104, 106 and 108, one server 112 and two users 114, 116 are depicted for simplicity of illustration and ease of understanding, more or fewer of each may be interconnected. In the environment 100, a user may access information such as web pages. Web pages may, for example, form a web site describing goods or services available from a vendor at a given point in time.

Typically, interconnections may employ TCP/IP for effectuating data and message routing and communication, and may facilitate connection to remote devices (e.g., web sites, other computer systems and the like) using IP (internet protocol) addresses, URIs (universal resource identifiers) and/or URLs (universal resource locators).

It will be appreciated that the network connections shown are illustrative and other techniques for establishing a communications link between the computers can be used. The existence of any of various well-known protocols such as TCP/IP, Ethernet, FTP, HTTP, WAP, WAE and the like is presumed, and the system can be operated in a client-server configuration to permit a user to retrieve web pages from a web-based server. Any of various conventional web browsers can be used to display and manipulate data on web pages.

Typically, web pages have been built using toolkits such as, by way of example, the Mobile Internet Toolkit from the Microsoft Corporation of Redmond, Wash., which allows ASP.NET developers to create mobile web applications. The adaptive formatting image control functionality may be an application incorporated within the broader application, such as the mobile Internet toolkit described. Using the primary toolkit, the Mobile Internet Toolkit in this example, the web page developer may select the web site content. In the course of such selection, the web page developer may choose to incorporate images including sound clips, text components, user controls, query boxes, company logos, photographs, graphic images or any other image-based or multimedia data.

Each web site may include hundreds or thousands of pages. The contents of these web pages or the number of web pages comprising each web site may change over time, for example, as the vendor changes inventory, adds or deletes specific supplier alliances and the like.

Such information may take time to access, and requires system resources, such as memory and/or processor capacity, in order to be properly displayed to a user, to allow the user to browse through the web site, to rapidly convey information to the user and to facilitate user interaction (e.g., placing an order, formulating an inquiry or the like). Competitive advantages accrue when those system resources needed to support a given web site are decreased and also when user convenience increases.

Accordingly, when techniques are implemented that improve scalability of system attributes to accommodate and instantiate such changes, and to facilitate such, as well as promoting user-friendliness, system resources may be deployed more effectively. As a result, vendor cost profiles are improved, system cost profiles are improved, programmer resource utilization for implementation of web sites and modifications may be improved, user satisfaction increases and, in general, the wheels of commerce rotate more smoothly and harmoniously. FIGS. 2-5 and accompanying text describe the disclosed concepts in more detail with reference to the environment 100 addressed above in the context of FIG. 1.

Process

Figure 2A:
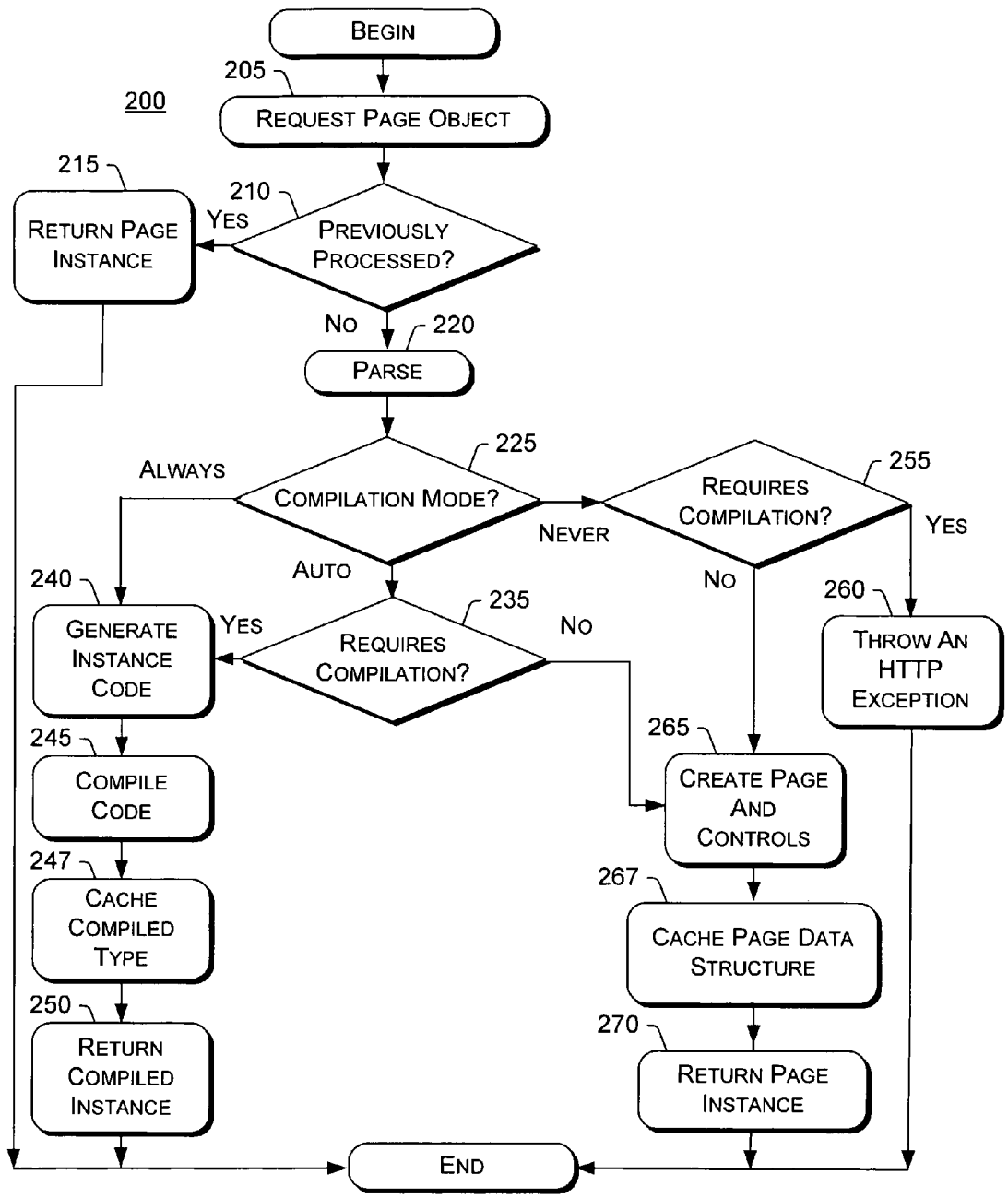
FIGS. 2A and 2B are flowcharts illustrating processes that find utility in the environment of FIG. 1.
Figure 2B:
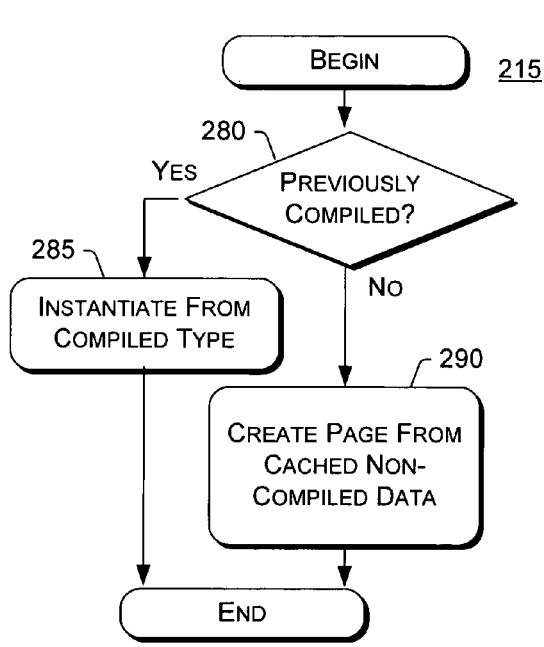

FIGS. 2A and 2B are flowcharts illustrating processes 200 and 215 suitable for practicing concepts associated with the present disclosure and that finds utility in the environment 100 of FIG. 1. For example, the process 200 analyzes a page object and provides suitable output. The process 200 begins when a page object is requested (block 205). A user may invoke such by selecting a page corresponding to the page object.

In a query task 210, the process 200 determines if the page object requested in the block 205 has been previously processed. When the query task 210 determines that the page object has been previously processed, control passes to block 215. When the query task 210 determines that the page object has not been previously processed, control passes to the block 220.

When control passes to the block 215, a page instance associated with the page object is returned, as is described below in more detail with reference to FIG. 2B. The process 200 then ends.

When control passes to the block 220, the page object requested in the block 205 is parsed. Control then passes to a query task 225. Typically, the page object includes high level language description of the page object.

In the query task 225, a compilation mode for the page object requested in the block 205 is determined. In one embodiment, the compilation mode is determined from a variable or attribute in the page object and may have a value of AUTO, ALWAYS or NEVER.

When the query task 225 determines that the compilation mode variable is AUTO, control passes to a query task 235. The query task 235 determines if the page object requested in the block 205 requires compilation. For example, the page object may include user-developed code that requires compilation in order for the page object to be instantiated as a web page.

When the query task 235 determines that the page object requires compilation, or when the query task 225 determines that the compilation mode for the page object is ALWAYS, control passes to a block 240.

In block 240, code is generated to create an instance of controls associated with the page object when it is instantiated. Properties for such are also set. Control then passes to a block 245.

In block 245, the code is compiled into an assembly or compiled type. Control then passes to a block 247.

In the block 247, the compiled type is cached, that is, is stored in a memory for later use. Control then passes to a block 250.

In the block 250, a compiled instantiation of the page, corresponding to the page object requested in the block 205, is returned. The process 200 then ends.

When the query task 225 determines that the compilation mode is NEVER, control passes to a query task 255. In the query task 255, the process 200 determines when the page object requested in the block 205 requires compilation.

When the query task 255 determines that the page object requires compilation, control passes to a block 260. In the block 260, an error message is generated. For example, the process 200 may throw an HTTP exception in the block 260. The process 200 then ends.

When the query task 255 determines that the page object does not require compilation, or when the query task 235 determines that a page object selected as having the compilation mode AUTOMATIC by the query task 225 does not require compilation, control passes to a block 265.

In the block 265, an instance of the page and attendant user controls is created, corresponding to the page object that was requested in the block 205. Control then passes to a block 267.

In the block 267, the page data structure of the instance created in the block 260 is cached. Control then passes to a block 270.

In the block 270, an instantiation of the page corresponding to the page object that was requested in the block 205 is returned. The process 200 then ends.

FIG. 2B is a flow chart 215 describing how the process 200 handles a page request when the query task 210 determines that the page object has been previously processed. The process 215 begins with a query task 280 to determine whether the previously processed page has been previously compiled.

When the query task 280 determines that the previously processed page has been previously compiled, control passes to a block 285. In the block 285, the process 215 instantiates the page from the compiled type.

When the query task 280 determines that the previously-processed page has not been previously compiled, control passes to a block 290. In the block 290, the process 215 creates the page from cached non-compiled data. In either case, the processes 200 and 215 then end.

User Interface

Figure 3:
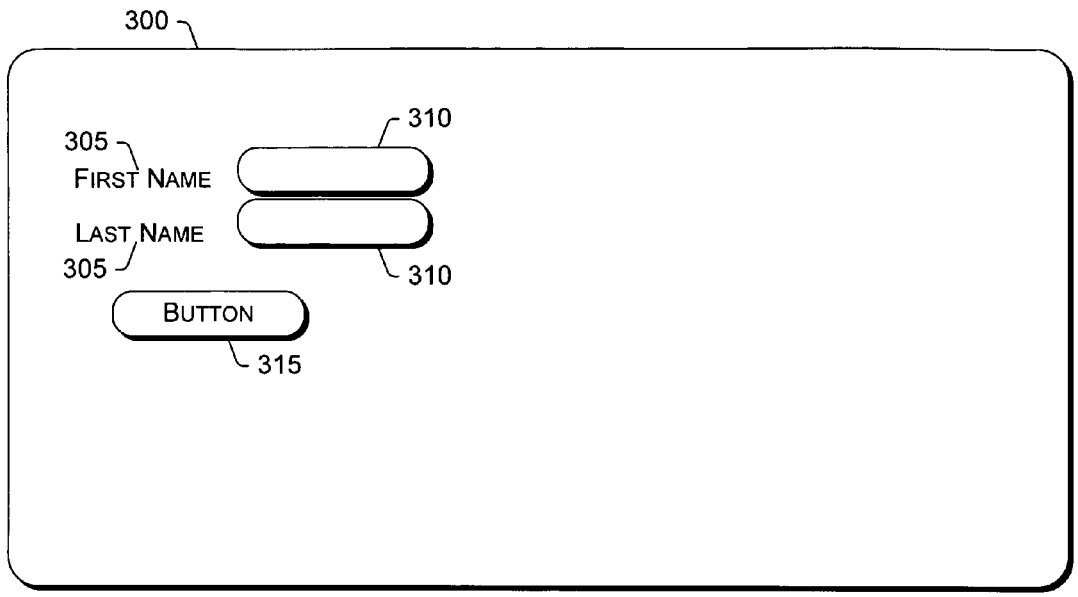
FIG. 3 is an example of a graphical user interface for facilitating interaction of a user (e.g., such as one of the clients of FIG. 1) with web pages created via the processes of FIGS. 2A and 2B.

FIG. 3 is an example of a graphical user interface 300 or GUI 300 for facilitating interaction of a user (e.g., such as one of clients 102, 104, 106, 108 of FIG. 1) with web pages created via the processes 200/215 of FIGS. 2A and 2B. The GUI 300 generally includes labels 305 for user input boxes 310 and a button 315 for user indication of completion of entries into the user input boxes 310. Generating a web page providing access to the GUI 300 generally involves creation of control elements (e.g., via the blocks 245, 265), such as user input boxes 310 and button 315.

Page Instantiation

Figure 4:
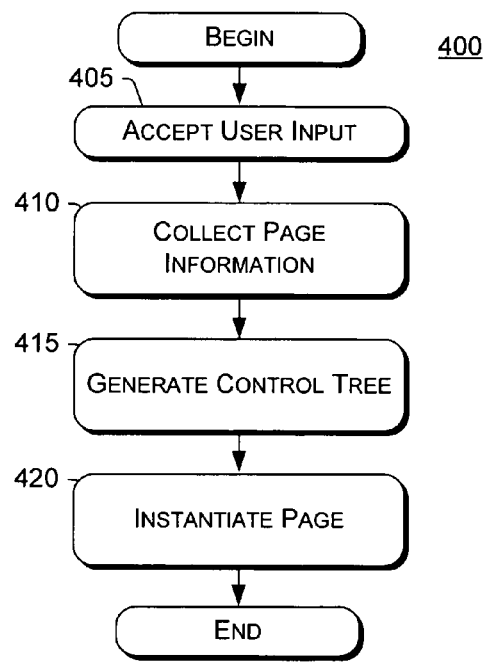
FIG. 4 is a flowchart of a process for instantiating a web page such as the GUI of FIG. 3 via the processes of FIGS. 2A and 2B.

FIG. 4 is a flowchart depicting a process 400 for instantiating a web page such as the GUI 300 of FIG. 3 via the processes 200/215 of FIGS. 2A and 2B. The process 400 begins in a block 405, generally concerned with accepting user input information via user interfaces configured to facilitate individual user-controlled modification of parameters, which may include selecting one or more web pages. Control then passes to a block 410.

In the block 410, the process 400 collects information corresponding to the page. The information may correspond to a previously-compiled version of the page that has been cached, an object not requiring compilation or a code object including a compilation variable having a value selected from a group consisting of: AUTOMATIC, NEVER and ALWAYS.

In a block 415, the process 400 generates a control tree, for example, by using the processes 200/215 of FIGS. 2A and 2B. The control tree includes information needed to instantiate the page, such as controls, e.g., button 315 of FIG. 3, text boxes such as shown at 305 of FIG. 3 and may include information regarding related pages (parent/children pages etc., not shown). When the code object includes enough information (control builders) for page instantiation without requiring compilation, the tree of control builders may have been previously cached.

In a block 420, the process 400 instantiates the page. For example, the process 400 results in a graphical user interface such as GUI 300 of FIG. 3. The process 400 then ends.

EXAMPLES

A series of examples are provided to illustrate some applications for the subject matter of the present disclosure in the context of web page tasks, such as may be implemented via a distributed computer system. The examples are not intended to be exhaustive or to exemplify all aspects of the disclosure.

E.1 Improving Scalability.

Jane owns a WSS site with many users. Her site has hundreds of pages, and all of the users may independently browse to any of many different pages. Her site can readily be scaled to be larger or smaller under this scenario because the majority of the web pages in the web site are never compiled, so that when the users browse to those pages, a parse tree of the controls is loaded, but no dynamic link libraries ("DLLs") are loaded. Those web pages are simple user pages and do not need to have script on them.

E.2 Using Default ASP.NET Configuration Option.

Mort is a web page developer who is not sure about the CompilationMode values that need to be set for his project. For this case, Mort does not change the CompilationMode variable setting, which has a value equal to AUTO. At runtime, ASP.NET will determine whether or not it needs to compile the page.

```
<?xml version="1.0" encoding="utf-8"?>
<configuration>
    <system.web>
        <pages CompilationMode="Auto" />
    </system.web>
</configuration>
```

E.3 Defining Site Compilation.

Peter is a web site developer that has a site called expense. The site has two thousand pages (2,000), and the developer does not want ASP.NET to create multiple assemblies for his web site. As a result, Pete set the CompilationMode variable to NEVER in the page configuration section of the application's web.config. Since this setting is located at the config level, it will apply to all the web pages in the web site. As a result, ASP.NET will NOT perform the compilation steps for any page in this application. If a page in the site has code or some other constructs that require compilation, a parse error will be displayed (e.g., the block 260 of FIG. 2).

```
<?xml version="1.0" encoding="utf-8"?>
<configuration>
    <system.web>
        <pages CompilationMode="Never" />
    </system.web>
</configuration>
```

E.4 Defining Page Compilation.

A page developer would like to force a compilation in the page; as a result, the developer adds the CompilationMode attribute to the page directive. For this case, the developer set the CompilationMode variable to ALWAYS. As a result, ASP.NET will always compile the page regardless of the web.config configuration.

<%@page CompilationMode="Always" %>// page content goes here

E.5 Disabling Overriding the Page Attribute Config Value.

Alvaro is a web administrator who wishes to enforce the compilation mode for the whole application. He knows that the configuration setting could be over-writable by a page developer that defines a new or different CompilationMode value in the page directive. As a result, he put the Page configuration element in the page inside a location tag so that it cannot be overridden in the configuration file and then he set the ReadOnlyAttributes with the compilation mode.

```xml
<?xml version="1.0" encoding="utf-8"?>
<configuration>
    <system.web>
        <location path="/WSS" allowOverride=" false">
            <pages CompilationMode="Never"
                ReadOnlyAttributes="CompilationMode" />
        </location>
    </system.web>
</configuration>
```

E.6 Setting the Wrong Compilation Mode.

A page developer has set a page's CompilationMode to NEVER, which tells ASP.NET not to compile the page. However, the page contains a script block that includes an event handler to one of the buttons on the page, which requires ASP.NET to compile the page. As a result, when the page developer browses the page, a parse error will be displayed, telling them that CompilationMode attribute needs to be set either to AUTOMATIC or ALWAYS, because this web page object has content that needs to be compiled. At this point, the developer opens the page, changes the CompilationMode variable to either AUTOMATIC or ALWAYS, and now the page is working.

E.7 Providing a Safer Execution Environment.

The disclosed concepts also can provide a safer execution environment, by including tools for disabling the capability to write arbitrary code in the page. One mode for accomplishing this is to set the CompilationMode variable to NEVER. This prevents users from using certain coding features, such as the script tag.

For example, suppose that John has contributor rights to a WSS server, which gives him the right to add aspx pages to WSS. John is a malicious user and wants to be able to add script on his page to take over the WSS server. So John adds a "<script runat=server>" block in the middle of the page and adds harmful script. But no compile variable is turned ON by the system, and when John browses to his page, the script is not compiled, instead returning a parse error. John is thus blocked from running malicious script on the server.

E.8 WebPart Page does not Require Page Compilation.

A page developer has the home page of the company portal written on the ASP.NET web part framework. The page only contains a Web part manager, Zone and Web Part. Because the portal host includes multiple divisions, the developer would like to see how he can scale the ASP.NET application. The developer checks the page and realizes that it does not have any item that forces compilation by looking at the documentation (which contains a list of items that force compilation). Inasmuch as, in this site, the CompilationMode is set to AUTO, ASP.NET will not compile this page at runtime.

E.9 Content Page Won't Require Compilation with Master Page.

A page developer has a portal application that has thousands of pages. All the pages in the portal use the same master page. Because his site CompilationMode attribute is set to AUTO, ASP.NET will not compile the Content page, but it will compile the master page, at runtime.

Computer System

Figure 5:
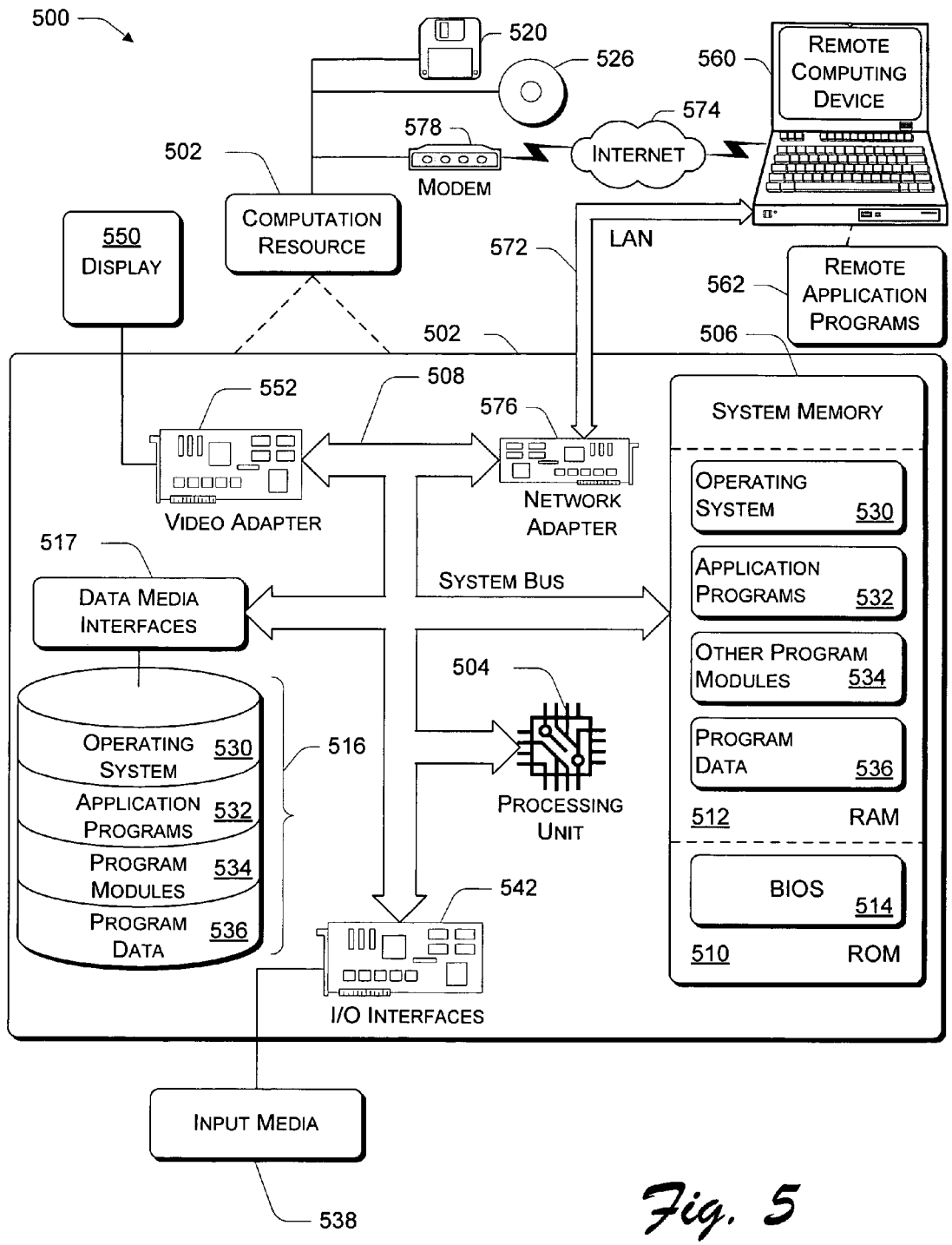
FIG. 5 illustrates an example of a general computer useful in the context of the environment of FIG. 1 and/or with the processes of FIGS. 2A and 2B.

FIG. 5 is a block diagram of a computer system 500 applicable to the context of the processes 200/215 of FIGS. 2A and 2B. The present disclosure is provided in part in the general context of computer-executable instructions, such as program modules, executed by one or more computers or other devices. Generally, program modules include routines, programs, objects, components, data structures etc. that perform particular tasks or implement particular abstract data types. Typically, the functionality of the program modules may be combined or distributed as desired in various embodiments.

The concepts disclosed herein may be implemented in hardware or a combination of hardware, software, and/or firmware. For example, one or more application specific integrated circuits (ASICs) could be designed or programmed to embody the concepts disclosed herein.

FIG. 5 illustrates an example of a general computer environment 500. The illustrated operating environment is only one example of a suitable operating environment and is not intended to suggest any limitation as to the scope of use or functionality of the embodiments of this disclosure. Other well-known computing systems, environments, and/or configurations may be suitable for implementation of the disclosure.

FIG. 5 depicts a general example of a computation resource 502 that can be used to implement the processes described herein. The computation resource 502 is shown as an example of a computer in which various embodiments of these processes can be practiced. The computation resource 502 is illustrated as only an example of a computing device that may be used with the invention; other devices may alternatively used that include more components or alternatively fewer components than those illustrated in FIG. 5.

The computation resource 502 includes one or more processors or processing units 504, a system memory 506, and a bus 508 that couples various system components including the system memory 506 to processor(s) 504. The bus 508 represents one or more of any of several types of bus structures, including a memory bus or memory controller, a peripheral bus, an accelerated graphics port and a processor or local bus using any of a variety of bus architectures. The system memory 506 includes nonvolatile read only memory (ROM) 510 and random access memory (RAM) 512, which may or may not be a volatile memory. A basic input/output system (BIOS) 514, containing the basic routines that help to transfer information between elements within computation resource 502, such as during start-up, is stored in ROM 510.

The computation resource 502 further may include a hard disk drive 516 for reading from and writing to a hard disk, not shown, coupled to bus 508 via a data media interface 517 (e.g., a SCSI, ATA, or other type of interface); a magnetic disk drive (not shown) for reading from and writing to a removable magnetic disk 520 and an optical disk drive (not shown) for reading from and/or writing to a removable optical disk 526 such as a compact disc or CD, DVD, or other optical media. The hard disk drive 516, magnetic disk drive and/or optical disk drive are each coupled to the system bus 508 by one or more data media interfaces 517. Alternatively, the hard disk drive 516, magnetic disk drive and/or optical disk drive can be coupled to the system bus 508 by one or more interfaces (not shown).

The drives and their associated computer-readable media provide nonvolatile storage of computer readable instructions, data structures, program modules and other data for the computation resource 502. Although the exemplary environment is described herein as employing a hard disk drive 516, a removable magnetic disk 520 and a removable optical disk 526, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk drive 516, magnetic disk 520, optical disk 526, ROM 510, or RAM 512, including an operating system 530, one or more application programs 532, other program modules 534 and program data 536. A user may enter commands and information into computation resource 502 through input devices such as input media 538 (e.g., keyboard/keypad, tactile input or pointing device, joystick, touchscreen or touchpad, microphone, antenna etc.). Such input devices 538 are coupled to the processing unit 504 through an input/output interface 542 that is coupled to the system bus (e.g., a serial port interface, a parallel port interface, a universal serial bus (USB) interface, an IEEE 1354 (Firewire) interface, etc.). A monitor 550 or other type of display device is also coupled to the system bus 508 via an interface, such as a video adapter 552.

The computation resource 502 may include capability for operating in a networked environment using logical connections to one or more remote computers, such as a remote computer 560. The remote computer 560 may be a personal computer, a server, a router, a network PC, a peer device or other common network node, and typically includes many or all of the elements described above relative to the computation resource 502. In a networked environment, such as that illustrated with computing environment 500, program modules depicted relative to the computation resource 502, or portions thereof, may be stored in a remote memory storage device. By way of example, remote application programs 562 reside on a memory device of the remote computer 560. The logical connections represented in FIG. 5 may include a local area network (LAN) 572 and/or a wide area network (WAN) 574, but may also include other networks. Such networking environments are commonplace in offices, enterprise-wide computer networks, intranets and the Internet.

Such networking environments are commonplace in modern computer networks, and in association with intranets and the Internet. In certain embodiments, the computation resource 502 executes an Internet Web browser program (which may optionally be integrated into the operating system 530) such as the "Internet Explorer" Web browser manufactured and distributed by the Microsoft Corporation of Redmond, Wash.

When used in a LAN networking environment, the computation resource 502 is coupled to a network such as the local area network 572 through a network interface or adapter 576. When used in a WAN networking environment, the computation resource 502 typically includes interfaces such as a modem 578 or other means for establishing communications over the wide area network 574, such as the Internet. The modem 578, which may be internal or external, is coupled to the system bus 508 via a serial port interface.

In a networked environment, program modules depicted relative to the computation resource 502, or portions thereof, may be stored in the remote memory storage device. It will be appreciated that the network connections shown are exemplary and other means of establishing a communications link between the computers may be used.

A user 102, 104, 106, 108 (FIG. 1) using a computer may operate in a networked environment 100 using logical connections to one or more remote computers, such as a remote computer, which may be a personal computer, a server, a router, a network PC, a peer device or other common network node, and which typically includes many or all of the elements described above relative to the computer 500 of FIG. 5, although only some examples of memory storage devices are illustrated in FIG. 5.

The computation resource 502 typically includes at least some form of computer readable media. Computer readable media can be any available media that can be accessed by the computation resource 502. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by the computation resource 502.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

By way of example, and not limitation, communication media includes wired media such as wired network or direct-wired connection, and wireless media such as acoustic, RF, infrared and other wireless media. Combinations of any of the above should also be included within the scope of computer readable media.

CONCLUSION

Although the description above uses language that is specific to structural features and/or methodological acts, it is to be understood that the recitation of the appended claims is not limited to the specific features or acts described. Rather, the specific features and acts are disclosed as exemplary forms of implementing these concepts.

What is claimed is:

1. A process for parsing at least one code object comprising:

determining when a page associated with at least one code object has been previously processed;

parsing the at least one code object when the page is determined not to have been previously processed; and evaluating a value for a compilation attribute for the page, the value being chosen from a group consisting of: AUTOMATIC, NEVER AND ALWAYS;

if the compilation attribute is set to AUTOMATIC, examining the page for a presence of any element requiring compilation, and, when examining indicates that the page includes at least one element requiring compilation, invoking a compiler system to compile the at least one element;

if the compilation attribute is set to NEVER, not compiling any code objects on the page, examining the page for a presence of any element requiring compilation, and, when examining indicates that the page includes at least one element requiring compilation, generating an error message for each code object that requires compilation; and if the compilation attribute is set to ALWAYS, compiling all of the code objects on the page.

2. The process of claim 1, further comprising, when evaluating determines that the compilation attribute is set to AUTOMATIC, examining the page for presence of any element requiring compilation, and, when examining indicates that the page does not include at least one element requiring compilation, creating and caching a no-compile data structure from which a page and controls instance and set properties can be formed, forming the page and controls instance and set properties and returning the instance of the page and controls instance.

3. A page instantiation process comprising:

parsing a corresponding page object to determine a compilation mode therefore, wherein parsing comprises parsing an uncompiled page object that includes a high level language description of the page;

determining when the page object includes a compilation mode variable that is set to one of AUTOMATIC, NEVER and ALWAYS;

if the compilation mode is set to AUTOMATIC:

ascertaining when the page object includes an element requiring compilation, and, when ascertaining indicates that the page object includes an element requiring compilation, compiling the page object to provide a page instantiation; and ascertaining when the page object does not include an element requiring compilation, and, when ascertaining indicates that the page object does not include an element requiring compilation, not compiling the page object to provide a page instantiation;

if the compilation mode is set to NEVER, determining if the page object requires compilation, not compiling the page object to provide a page instantiation if the page object does not require compilation, and returning an error message if the page object does require compilation; and if the compilation mode is set to ALWAYS, compiling the page object to provide a page instantiation.

4. A system for instantiating a web page, comprising:

one or more processors;

computer storage readable media coupled to the one or more processors and including computer-readable instructions thereon configured to cause the one or more processors to determine when one or more code objects corresponding to a web page have been previously processed, and, when the one or more code objects have not been previously processed, parse the one or more code objects to evaluate a compilation mode for the one or more code objects;

wherein the computer readable instructions are configured to cause the one or more processors to:

automatically detect changes in content of the one or more code objects;

when the compilation mode is set to AUTOMATIC, dynamically compile the one or more code objects, when needed, to provide corresponding dynamic link libraries;

when the compilation mode is set to NEVER, prevent the compilation of one or more code objects when it is determined that the one or more code objects need to be compiled, and generate an error message for the one or more code objects when a determination is made that the one or more code objects need to be compiled, and cache the dynamic link libraries to facilitate reuse on subsequent requests.

5. The system of claim 4, further comprising computer readable instructions embodied in the media configured to cause the one or more processors to generate a control tree corresponding to the web page after evaluation of the compilation mode.

6. The system of claim 4, wherein the computer readable media includes computer-readable instructions thereon configured to cause the one or more processors to provide a graphical user interface employing a control tree generated from the one or more code objects.

7. The system of claim 4, wherein the computer readable media includes computer-readable instructions thereon configured to cause the one or more processors to instantiate the compiled page from a cached compiled type when the code object has been previously processed and the one or more code objects have been previously compiled.

* * * * *